US012591202B2

(12) United States Patent
Sedaghat et al.

(10) Patent No.: US 12,591,202 B2
(45) Date of Patent: Mar. 31, 2026

(54) DIGITAL HOLOGRAPHIC IMAGING TECHNIQUE WITH TWIN IMAGE ELIMINATION

(71) Applicants: BIOMERIEUX, Marcy l'etoile (FR); BIOASTER, Lyons (FR)

(72) Inventors: Zohreh Sedaghat, La Mulatiere (FR); Quentin Josso, Lyons (FR); Fabian Rol, La Verpilliere (FR)

(73) Assignees: BIOMERIEUX, Marcy l'Etoile (FR); BIOASTER, Lyons (FR)

( * ) Notice: Subject to any disclaimer, the term of this patent is extended or adjusted under 35 U.S.C. 154(b) by 329 days.

(21) Appl. No.: 18/031,663

(22) PCT Filed: Oct. 19, 2021

(86) PCT No.: PCT/FR2021/051820
§ 371 (c)(1),
(2) Date: Apr. 13, 2023

(87) PCT Pub. No.: WO2022/084619
PCT Pub. Date: Apr. 28, 2022

(65) Prior Publication Data
US 2023/0408977 A1 Dec. 21, 2023

(30) Foreign Application Priority Data
Oct. 20, 2020 (FR) ...................................... 2010751

(51) Int. Cl.
*G03H 1/08* (2006.01)
*G03H 1/00* (2006.01)
*G03H 1/04* (2006.01)

(52) U.S. Cl.
CPC ......... *G03H 1/0005* (2013.01); *G03H 1/0866* (2013.01); *G03H 2001/0447* (2013.01);
(Continued)

(58) Field of Classification Search
CPC ......... G03H 1/0866; G03H 2001/0447; G03H 2001/0816; G03H 2001/0883
See application file for complete search history.

(56) References Cited

U.S. PATENT DOCUMENTS 9,007,433 B2 4/2015 Ozcan et al.
2017/0329281 A1* 11/2017 Tagawa ................ G03H 1/0866
(Continued)

FOREIGN PATENT DOCUMENTS

CN 105629696 A 6/2016
JP 2013-508775 A 3/2013
(Continued)

OTHER PUBLICATIONS

Li et al., "Twin image reduction method for digital in-line holography by using a digital periphery," Optik: International Journal for Light and Electron Optics, 193, 2019, 162988, https://doi.org/10.1016/j.ijleo.2019.162988. (Year: 2019).*
(Continued)

*Primary Examiner* — Nicholas R. Pasko
(74) *Attorney, Agent, or Firm* — Harness, Dickey & Pierce, P.L.C.

(57) ABSTRACT

A digital holographic imaging technique, includes iterative steps of: a) through back-propagation to the object coordinate of a hologram field comprising a spatial distribution of amplitude corresponding to the spatial distribution of intensity of the hologram and a spatial distribution of phase, determining an object field involving a spatial distribution of absorption and of phase shift of the imaged object, b) thresholding the values of the spatial distribution of absorption and of phase shift by decreasing the values to below a respective threshold, the thresholds decreasing in each iteration, c) through repropagation of the object field to the hologram coordinate, determining a modified hologram field comprising a modified spatial distribution of amplitude and
(Continued)

a modified spatial distribution of phase, d) replacing the spatial distribution of phase of the hologram field with the modified spatial distribution of phase, the spatial distribution of phase shift and of absorption of the imaged object being those of the object field of the last iteration.

10 Claims, 6 Drawing Sheets

(52) U.S. Cl.
CPC ............... *G03H 2001/0816* (2013.01); *G03H 2001/0883* (2013.01)

(56) References Cited

U.S. PATENT DOCUMENTS

| | | | | |
|---|---|---|---|---|
| 2018/0181062 A1* | 6/2018 | Yurt | ......................... | G03H 1/12 |
| 2020/0057411 A1* | 2/2020 | Haeffele | .............. | G03H 1/2294 |
| 2022/0057751 A1* | 2/2022 | Christmas | ............... | G06T 9/007 |

FOREIGN PATENT DOCUMENTS

| | | |
|---|---|---|
| JP | 2020-514704 A | 5/2020 |
| WO | 2016/084420 A1 | 6/2016 |

OTHER PUBLICATIONS

Mallery et al., "Regularized inverse holographic volume reconstruction for 3D particle tracking," Optics Express, vol. 27, No. 13, Jun. 24, 2019, 18069-18084, https://doi.org/10.1364/OE.27.018069. (Year: 2019).*

Maycock, "Improving reconstructions of digital holograms," Thesis, National University of Ireland, Dec. 2012. (Year: 2012).*

Momey et al., "From Fienup's phase retrieval techniques to regularized inversion for in-line holography: tutorial," Journal of the optical society of America, vol. 36, No. 12, Dec. 2019, D62-D80, https://doi.org/10.1364/JOSAA.36.000D62. (Year: 2019).*

Rong et al., "Twin image elimination from two in-line holograms via phase retrieval," Chinese optics letters, 10(6), Jun. 10, 2012, doi: 10.3788/COL201210.060902. (Year: 2012).*

English Translation of International Search Report for PCT application Serial No. PCT/FR2021/051820 (Feb. 9, 2022).

INPI Search Report and Written Opinion for French application Serial No. FR2010751 (Jun. 17, 2021).

Hattay, J., et al., "Digital in-line particle holography: twin-image suppression using sparse blind source separation," Signal, Image and Video Processing, vol. 9, No. 8, pp. 1767-1774 (May 25, 2014).

Donoho, D., "De-noising by soft-thresholding," IEEE Transactions on Information Theory, vol. 41, No. 3, pp. 613-627 (May 1, 1995).

Denis, L., et al., "Twin-Image Noise Reduction by Phase Retrieval in In-Line Digital Holography," Proceedings of SPIE, vol. 5914 (2005).

JP2023-523545 Translation of Office Action (Oct. 14, 2025).

* cited by examiner

FIG 1

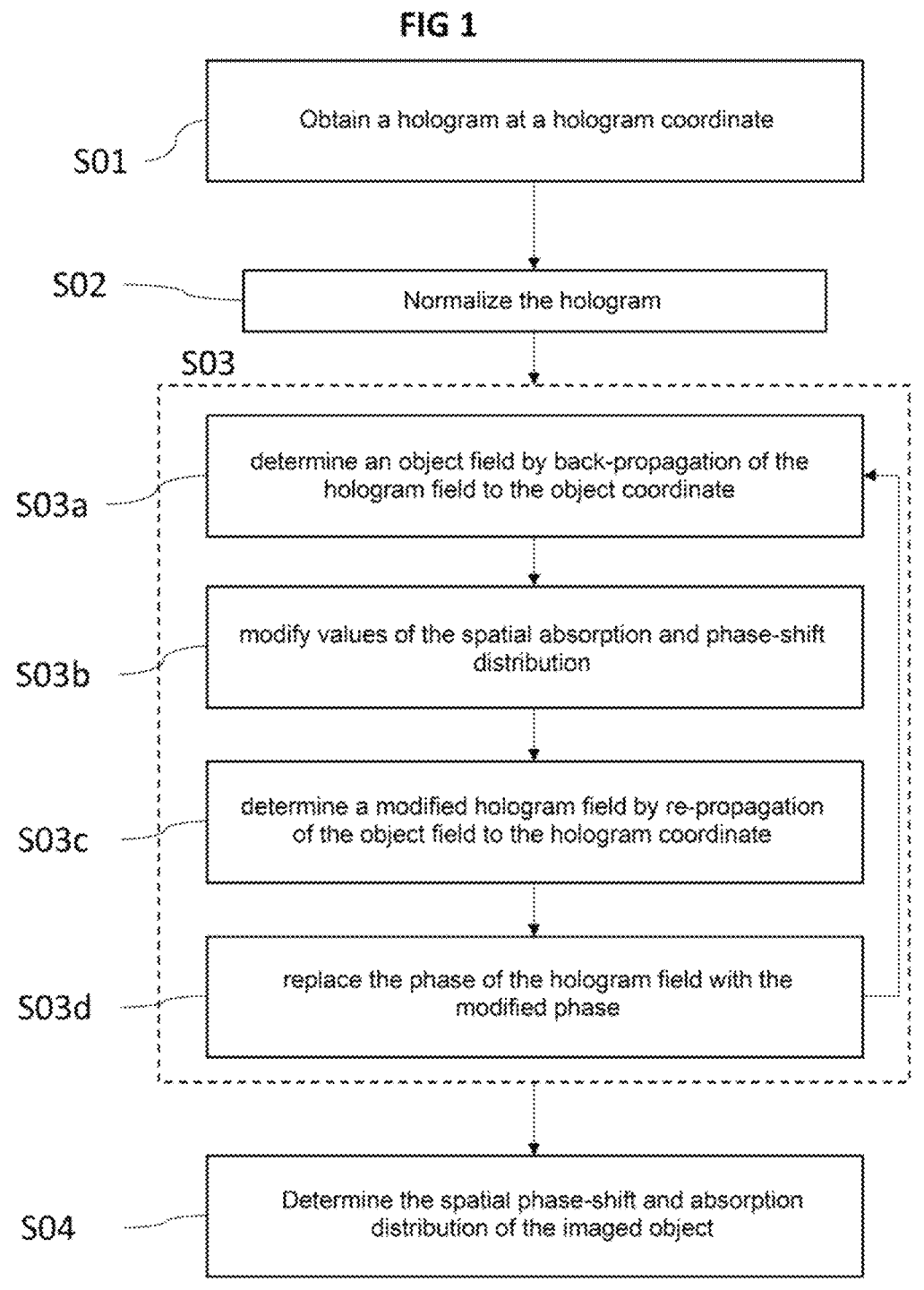

Obtain a hologram at a hologram coordinate

S01

S02

Normalize the hologram

S03

S03a determine an object field by back-propagation of the hologram field to the object coordinate S03b modify values of the spatial absorption and phase-shift distribution S03c determine a modified hologram field by re-propagation of the object field to the hologram coordinate S03d replace the phase of the hologram field with the modified phase

S04

Determine the spatial phase-shift and absorption distribution of the imaged object

FIG 3
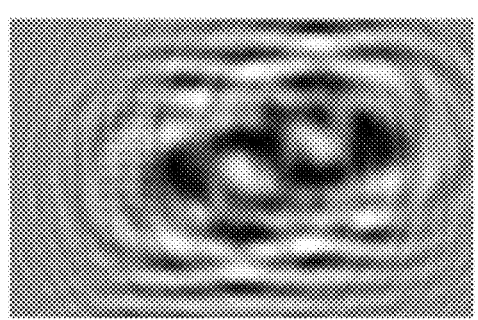
FIG 4a
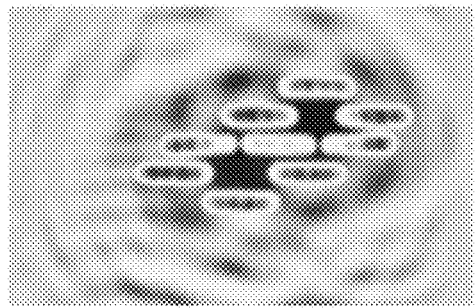
FIG 4b
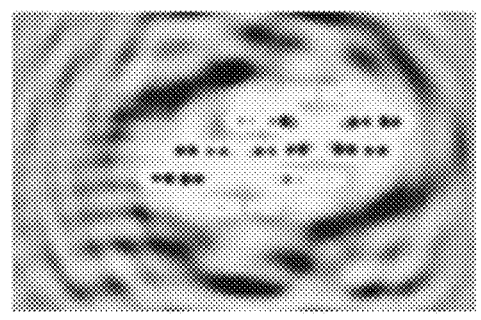
FIG 4c
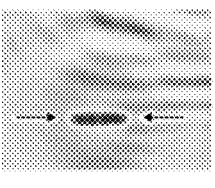
FIG 4d
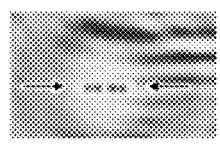

FIG 5a
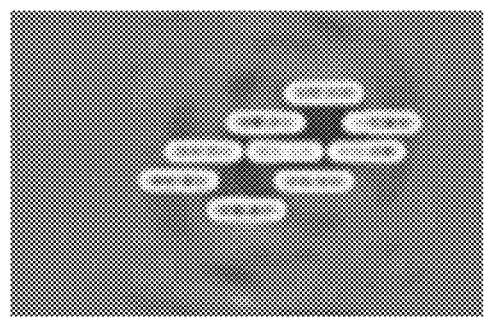
FIG 5b
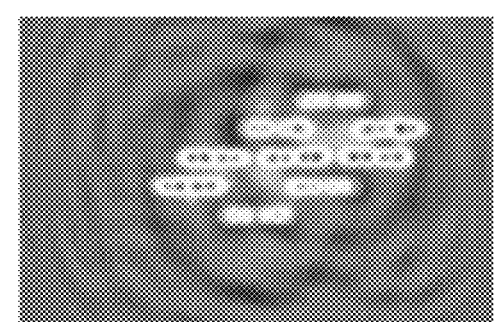
FIG 5c
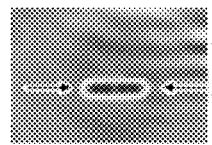 
FIG 5d
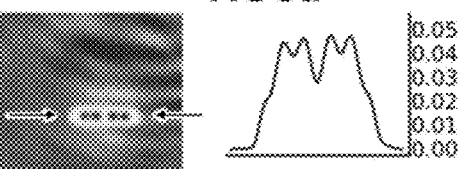
FIG 6a
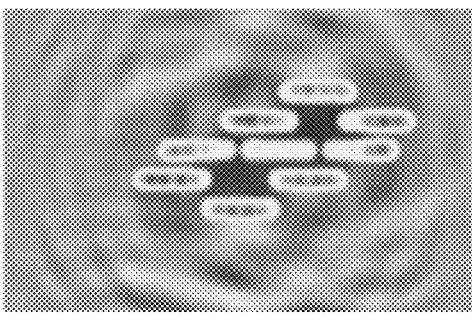
FIG 6b
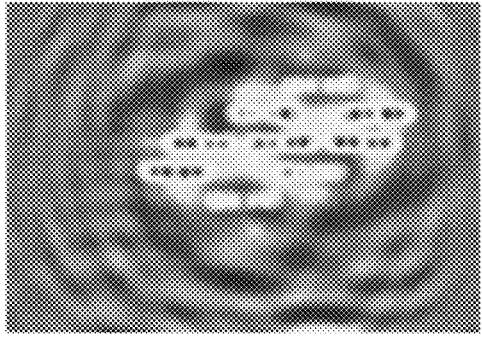
FIG 6c
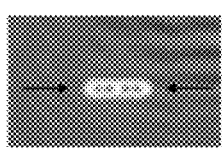
FIG 6d

FIG 9a
FIG 9b
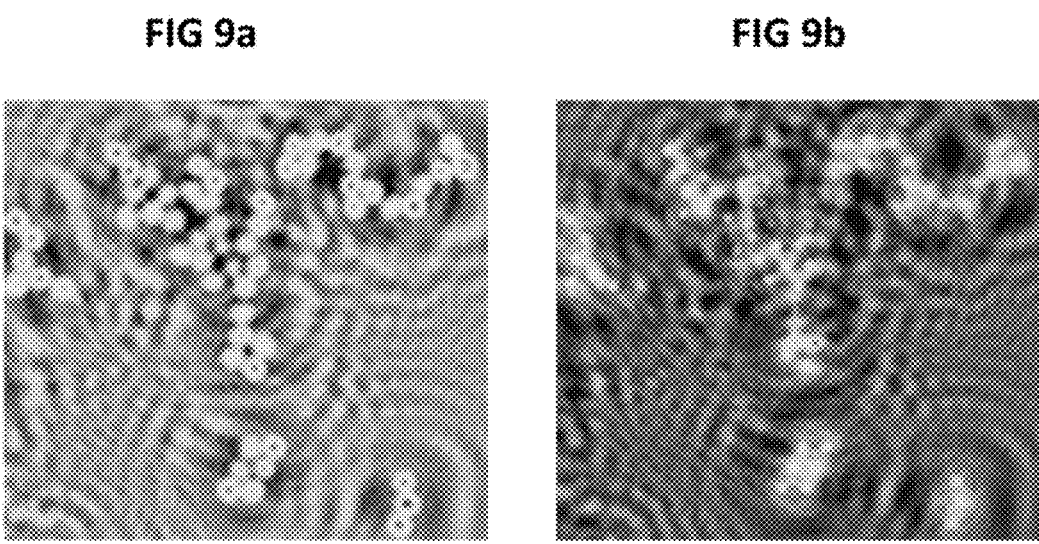
FIG 10a
FIG 10b
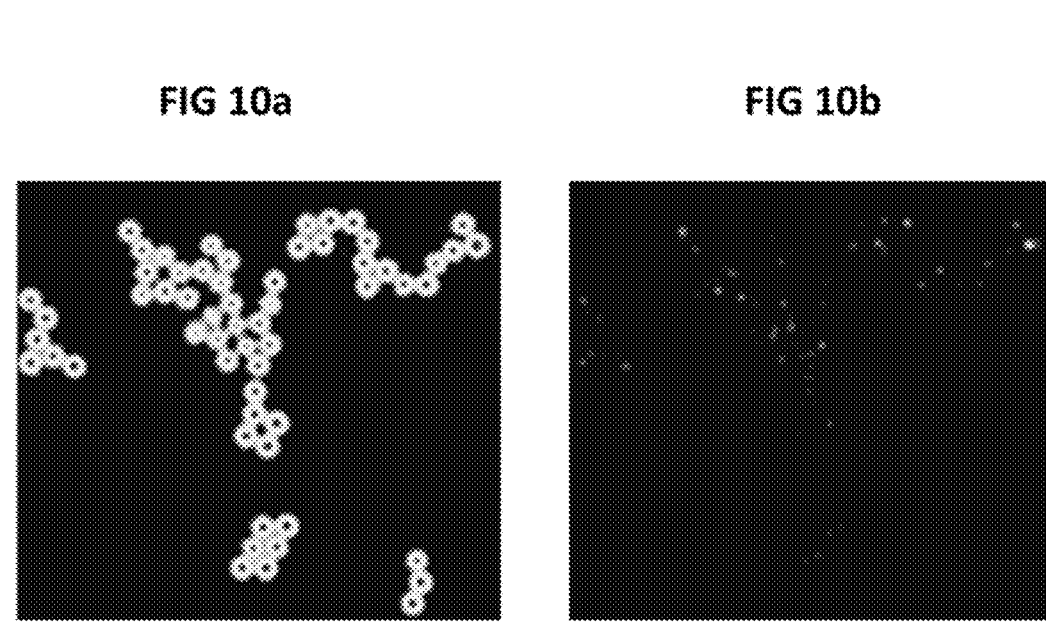

DIGITAL HOLOGRAPHIC IMAGING TECHNIQUE WITH TWIN IMAGE ELIMINATION

CROSS-REFERENCE TO RELATED APPLICATIONS

This application is a national phase entry of PCT Patent Application Serial No. PCT/FR2021/051820 filed on Oct. 19, 2021, which claims priority to the French Patent Application Serial No. FR2010751 filed Oct. 20, 2020, both of which are incorporated by reference herein.

TECHNICAL FIELD

The present invention relates to the field of digital holography, and more precisely pertains to a method for removing a twin image in digital holographic imaging.

BACKGROUND

Digital holography is a method for recording, with a sensor, a hologram representative of the phase and amplitude of the wave diffracted by an object. The hologram records the spatial intensity distribution of the interference patterns generated by the illumination beam and the light diffracted by the imaged object. The hologram makes it possible to reconstruct the image of the object via computation, using a digital reconstruction algorithm. More precisely, the phase and absorption characteristics of the imaged object are obtained by back-propagation from the hologram, the back-propagation being computed using a propagation algorithm that is for example based on Rayleigh-Sommerfeld diffraction theory.

Digital holography is particularly used in biological imaging because of its ability to image transparent objects, such as biological cells or organisms, and in particular in digital holographic microscopy. Specifically, contrary to other imaging methods, digital holography does not require injection of dyes to make transparent objects visible, nor use of high-energy radiation (e.g. x-rays) that may damage the imaged biological objects.

Holographic imaging aims to find the spatial phase-shift and absorption distribution of the imaged object. Specifically, these characteristics of the imaged object make it possible to precisely characterize the imaged object, and thus make it possible, for example, to identify it.

Among the various holography methods, in-line holography has a high phase sensitivity, and is therefore the most suitable method for imaging low-phase biological objects.

However, in-line holography has a major drawback, namely the presence of a twin image or orthoscopic image resulting from the loss of phase information in the hologram, which records only intensity. The twin image is an artefact that appears in the hologram to result from an additional imaged object arranged symmetrically to the imaged object with respect to the plane of the hologram. Since the twin image is out of focus, it results, during the reconstruction of the phase and absorption images, in a distortion of the shape of the imaged object, which may prevent exploitation of these images.

SUMMARY

The invention aims to allow artefacts due to the presence of a twin image to be removed during in-line holography.

To this end, the invention provides a digital holographic imaging method, comprising the following steps:

1) obtaining a hologram by holography, said hologram being representative of a spatial intensity distribution, in a hologram plane at a hologram coordinate of an imaged object, of the interference caused by interactions between an illumination beam and said imaged object placed at an object coordinate on an imaging axis, 2) implementing a plurality of iterations, each comprising the following steps:

2.a) by back-propagation to the object coordinate of a hologram field comprising a spatial amplitude distribution corresponding to the spatial intensity distribution of the hologram and a spatial phase distribution, determining an object field containing a spatial absorption distribution and a spatial phase-shift distribution of the imaged object, 2.b) thresholding the values of the spatial absorption distribution and of the spatial phase-shift distribution of the imaged object by decreasing the values of the spatial absorption distribution below an absorption threshold and by decreasing the values of the spatial phase-shift distribution below a phase-shift threshold, the absorption threshold and the phase-shift threshold decreasing with each iteration, 2.c) by re-propagation of the object field to the hologram coordinate, determining a modified hologram field comprising a modified spatial amplitude distribution and a modified spatial phase distribution, 2.d) replacing the spatial phase distribution of the hologram field with the modified spatial phase distribution, the spatial amplitude distribution of the hologram field being retained, 3) determining the spatial phase-shift distribution and the spatial absorption distribution of the imaged object as being those of the object field of the last iteration.

The invention is advantageously supplemented by the various following characteristics, which may be implemented alone or in their various possible combinations:

during thresholding, the values of the spatial absorption distribution below the absorption threshold and the values of the spatial phase-shift distribution below the phase-shift threshold are set to zero;

the absorption threshold depends on maximum values of the spatial absorption distribution, and the phase-shift threshold depends on maximum values of the spatial phase-shift distribution contained in the object field;

in the first iteration, the absorption threshold and/or the phase-shift threshold corresponds to between 40% and 15% of a maximum value of the spatial absorption distribution or spatial phase-shift distribution, respectively;

in each iteration, the absorption threshold and/or the phase-shift threshold is decreased by 1% to 6% of a maximum value of the spatial absorption distribution or spatial phase-shift distribution;

in the last iteration, the absorption threshold and the phase-shift threshold are set to zero;

during thresholding, the values of the spatial absorption and phase-shift distribution are kept positive or zero during the iterations;

before the iterations, the hologram field is normalized by dividing the values of the spatial intensity distribution by a background image value corresponding to an intensity of the illumination beam at the hologram coordinate;

the thresholding comprises a smoothing of the modified spatial absorption distribution and of the modified spatial phase-shift distribution;

the hologram field and/or the object field have a spatial resolution that increases with the iterations.

BRIEF DESCRIPTION OF THE DRAWINGS

Other features, aims and advantages of the invention will become apparent from the following description, which is purely illustrative and non-limiting, and which must be read with reference to the appended drawings, in which:

FIG. 1 is a flowchart illustrating the main steps of the method according to one possible embodiment of the invention, FIG. 2 schematically shows one example of a holographic imaging system used to acquire a hologram according to one possible embodiment of the invention, FIG. 3 shows a hologram of a cluster of bacteria of a first example of implementation of the method according to one possible embodiment of the invention, FIG. 4a shows an initial spatial phase-shift distribution determined from the hologram of FIG. 3, in the first example of implementation of the method according to one possible embodiment of the invention, FIG. 4b shows an initial spatial absorption distribution determined from the hologram of FIG. 3, in the first example of implementation of the method according to one possible embodiment of the invention, FIG. 4c shows a profile of phase-shift values of a bacterium in FIG. 4a, FIG. 4d shows a profile of absorption values of a bacterium in FIG. 4b, FIG. 5a shows a spatial phase-shift distribution after the first iteration, in the first example of implementation of the method according to one possible embodiment of the invention, FIG. 5b shows a spatial absorption distribution after the first iteration, in the first example of implementation of the method according to one possible embodiment of the invention, FIG. 5c shows a profile of phase-shift values of a bacterium in FIG. 5a, FIG. 5d shows a profile of absorption values of a bacterium in FIG. 5b, FIG. 6a shows a spatial phase-shift distribution after the fifth iteration, in the first example of implementation of the method according to one possible embodiment of the invention, FIG. 6b shows a spatial absorption distribution after the fifth iteration, in the first example of implementation of the method according to one possible embodiment of the invention, FIG. 6c shows a profile of phase-shift values of a bacterium in FIG. 6a, FIG. 6d shows a profile of absorption values of a bacterium in FIG. 6b, FIG. 9a shows, before the first iteration, an initial spatial phase-shift distribution determined from the hologram of FIG. 8a, in the second example of implementation of the method according to one possible embodiment of the invention, FIG. 9b shows, before the first iteration, an initial spatial absorption distribution determined from the hologram of FIG. 8b, in the second example of implementation of the method according to one possible embodiment of the invention, FIG. 10a shows a spatial phase-shift distribution after the twentieth iteration, in the second example of implementation of the method according to one possible embodiment of the invention, FIG. 10b shows a spatial absorption distribution after the twentieth iteration, in the second example of implementation of the method according to one possible embodiment of the invention.

DETAILED DESCRIPTION

With reference to FIG. 1, the digital holographic imaging method first comprises obtaining a hologram of an object imaged by holography (step S01), typically by in-line holography. It is not necessary for the holography to be in-line for the invention to be carried out, but it is in the context of in-line holography that the problem of the twin image is most acute. The hologram may be obtained in various ways, but the way in which it is obtained does not affect the method. In particular, the modalities of acquisition of the hologram are unimportant, as long as the hologram is representative of a spatial intensity distribution of the interference generated by the imaged object.

Figure 2:
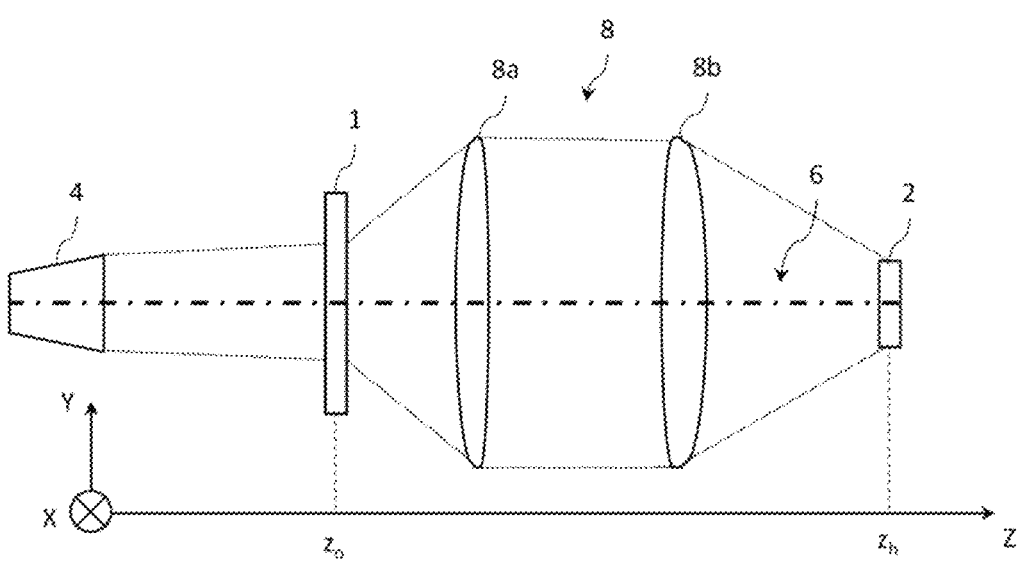

By way of non-limiting example, FIG. 2 schematically shows an in-line holographic imaging system for imaging an object 1 by means of a digital image sensor 2, which is placed in an image plane of the holographic imaging system. The imaging system defines an imaging axis 6, which for the sake of simplicity has here been represented by a straight line corresponding to the optical axis, but which may, depending on the configuration of the optical components of the imaging system, consist of a set of successive straight lines defining the path of the light. The object 1 is placed at an object coordinate $z_o$ on the imaging axis 6, while the image sensor 2 is placed at a hologram coordinate $z_h$ and lies perpendicular to the imaging axis 6. As a result thereof the hologram is representative of a spatial intensity distribution H(x,y), in a hologram plane (x,y), of the interference caused by interactions between the imaged object 1 placed at the object coordinate $z_o$ on an imaging axis 6 and the illumination beam.

A light source 4 is configured to illuminate the object 1 in the field of view of the holographic imaging system, by means of an illumination beam of sufficiently coherent light. The light source 4 may produce the illumination light, or simply be the end of an optical fiber conveying this illumination light. The illumination beam has the conventional characteristics required for holographic imaging, without particular additional constraints. The illumination beam may thus be monochromatic (for example with a wavelength of about 500 nm) or possibly be composed of a plurality of wavelengths, which are for example used one after the other. The holographic imaging system is here equipped with a microscope objective 8 (schematized here by an entrance lens 8a and an exit lens 8b) placed between the sample 1 and the digital image sensor 2. The microscope objective 8 is however optional, the invention not being limited to holographic microscopy employing a lens. The arrangement described here is of course one non-limiting example. Any holographic imaging system may be used, whether it employs a microscope objective or not, etc. Thus, provided that a given holographic imaging system is able to acquire an image in which interference patterns generated by the object 1 appear, this holographic imaging system is suitable for implementing the method. In contrast, it is necessary for the object coordinates $z_o$ and the hologram coordinates $z_h$ that were used to acquire the obtained hologram to be known.

During acquisition of a hologram, the light source 4 emits a reference illumination beam, which may be considered a reference plane wave propagating in the Z-direction along the imaging axis 6, and which may be described by:

$$R(z)=A \exp(j2\pi z/\lambda)$$

with A the amplitude and k the wavelength of the reference wave emitted by the light source 4. The object 1 is placed at the coordinate $z_o$ on the imaging axis 6, and, because of its diffractive properties, will scatter the incident reference light. This results in a wave scattered by the object 1, which is denoted O(x, y, z). The scattered wave O(x, y, z) and the reference wave R(z) interfere at the image sensor 2 to form the hologram, defining a holographic plane (in x, y) at the hologram coordinate $z_h$, which is the coordinate of the image sensor 2 on the imaging axis 6. Since a digital image sensor 2 is sensitive only to the intensity of the electromagnetic field, the hologram corresponds to the spatial intensity distribution H(x, y, $z_h$) of the total field at the hologram coordinate $z_h$, designated the hologram field:

$$H(x,y,z_h)=|R(z_h)+O(x,y,z_h)|^2$$

In the absence of the object 1, only the intensity of the reference wave would be detected, and the hologram field would be:

$$H(x,y,z_h)=|R(z_h)|^2=|A|^2=B(z_h)$$

$B(z_h)$ is called the background image at the hologram coordinate $z_h$.

The scattered wave O(x, y, z) is related to the reference wave R(z) by a complex transmission function t(x,y) such that O(x, y, z)=t(x, y)R($z_o$), and the total field U(x, y, z) resulting from the addition of the scattered wave O(x, y, z) and of the reference wave R(z) may be written:

$$U(x,y,z_o)=R(z_o)(1+t(x,y)).$$

This relationship may be rewritten to reflect the fact that the reference wave is absorbed and has its phase shifted by the object 1:

$$U(x,y,z_o)=R(z_o)(1-a(x,y)\exp(-j\varphi(x,y)))$$

with a(x,y) being the absorption and $\varphi$(x,y) being the phase shift due to the object 1. These may be derived directly from the characteristics of the object 1 (structure, composition, etc.). The absorption a and the phase shift $\varphi$ may therefore also be considered to be characteristics related to the object 1, although also related to certain parameters such as the wavelength of the reference wave of the illumination beam.

Before continuing the method, it is possible to implement a normalization (step S02) of the spatial intensity distribution H(x,y) represented by the hologram, using the background image B($z_h$) at the hologram coordinate $z_h$. Dividing the values of the spatial intensity distribution H(x,y) by the background image B($z_h$), which has a uniform intensity value B, is equivalent to setting the amplitude A of the reference wave of the illumination beam to 1, and therefore allows the computations to be simplified. Below, the amplitude A will not be considered to be different from 1.

The method then comprises implementation of iterative steps (steps S03) aiming to determine the phase $\varphi$ and absorption a characteristics of the imaged object 1 via a plurality of cycles of back-propagation and re-propagation of light fields, in order to find the phase of the total field, which is not retained in the hologram. During these cycles, increasingly strict thresholding is applied to the phase $\varphi$ and the absorption a, in order to retain only the regions of highest amplitude, others being faded out. The number of iterations in particular depends on the decrease in the applied thresholds. Typically, the number of iterations is at least 8, and preferably at least 12.

The hologram field, which corresponds to propagation, to the hologram coordinate $z_h$, of the object field U(x,y,$z_o$), is a complex field that comprises the spatial amplitude distribution, which is represented by the spatial intensity distribution H(x, y) of the hologram, and a spatial phase distribution $\Omega$(x,y,$z_h$). The hologram field is therefore written:

$$U(x,y,z_h)=\sqrt{H(x,y)}\exp[j\Omega(x,y,z_h)]$$

Since the image sensor 2 is only sensitive to the intensity of the electromagnetic field, the spatial phase distribution $\Omega$ at the hologram coordinate $z_h$ is initially unknown, and must be set to an initialization value. It is advantageously chosen to be the phase $\Omega(z_h)$ of the reference wave R($z_h$) at the hologram coordinate $z_h$, which is estimated by direct propagation:

$$\exp(j2\pi z_h/\lambda)=\exp(j\Omega(z_h))$$

Thus, from the hologram, an initial hologram field comprising a spatial amplitude distribution corresponding to the spatial intensity distribution of the hologram, and an initial spatial phase distribution, which is set to an initialization value, is obtained.

In a first iterative step S03a, a complex object field is determined by back-propagation to the object coordinate $z_o$ of the hologram field. The back-propagation makes use of a light diffraction model, such as for example the Rayleigh-Sommerfeld model or the Kirchhoff diffraction model. Such a light diffraction model makes it possible, based on knowledge of the field expression at a first point, to determine the expression of the light field at a second point. It is possible in this regard to advantageously operate in the frequency domain, and in particular to use the plane-wave angular-spectrum method, which makes use of the Fourier transform, as described in the work of Joseph W. Goodman, "*Introduction to Fourier Optics*", McGraw-Hill companies, 3$^{rd}$ edition, 2005.

In a second iterative step S03b, the values of the spatial absorption distribution a(x,y) and of the spatial phase-shift distribution $\varphi$(x,y) of the imaged object 1 are extracted. As indicated above, the object field U(x,y,$z_o$) contains a spatial absorption distribution a(x,y) and a spatial phase-shift distribution $\varphi$(x,y) of the imaged object 1 (below and hereafter in normalized form):

$$U(x,y,z_o)=\exp(j\Omega(z_o))(1-a(x,y)\exp(-j\varphi(x,y)))$$

Via a multiplication with the conjugate of the reference wave incident on the object 1, i.e. by $\exp(-j\Omega(z_o))$, the absorption a and the shift $\varphi$ forming the complex transmission function are extracted. These values of absorption a and shift $\varphi$ result from the back-propagation of the hologram field to the object coordinate $z_o$, and may be extracted thanks to the presence of the reference wave.

Certain constraints are imposed on the possible values of the absorption a and the shift of the imaged object 1. First, due to conservation of energy, which implies that absorption by the object 1 must not lead to light amplitude increasing as a result of diffraction, it is necessary for the absorption values not to be negative, i.e. for $a(x,y) \geq 0$. If negative absorption values occur, they are the result of interference between the twin image and the reference wave, and they are replaced by zero values. In addition, it is also necessary for the phase shift to be positive, i.e. for $\varphi(x,y) \geq 0$. In the vast majority of cases, the imaged object 1 indeed has a refractive index greater than or equal to that of the light propagation medium. This is particularly the case when the imaged object 1 is a micro-organism such as a bacterium in an aqueous solution. This is also the case for almost all objects in air. Thus, the values of the spatial absorption distribution $a(x,y)$ and of the phase-shift distribution $\varphi(x,y)$ are kept positive or zero during the iterations.

Once extracted, the values of the spatial absorption distribution $a(x,y)$ and of the spatial phase-shift distribution $\varphi(x,y)$ of the imaged object 1 are modified by thresholding: they are modified by decreasing the values below a respective threshold. More precisely, the values of the spatial absorption distribution $a(x,y)$ below an absorption threshold are decreased, while the values of the spatial phase-shift distribution $\varphi(x,y)$ below a phase-shift threshold are decreased. The values of the spatial absorption distribution $a(x,y)$ above the absorption threshold are not decreased, and the values of the spatial phase-shift distribution $\varphi(x,y)$ above the phase-shift threshold are not decreased. The values of the spatial absorption distribution $a(x,y)$ below the absorption threshold and of the spatial phase-shift distribution $\varphi(x,y)$ below the phase-shift threshold are greatly decreased, by more than 50%, preferably by more than 75%, and more preferably are set to zero.

The values of the thresholds decrease with each iteration. Preferably, the absorption threshold depends on the values of the spatial absorption distribution $a(x,y)$, and the phase-shift threshold depends on the values of the spatial phase-shift distribution $\varphi(x,y)$. Preferably, the absorption threshold depends on the maximum values of the spatial absorption distribution $a(x,y)$, and preferably on the maximum value taken by the spatial absorption distribution $a(x,y)$. Similarly, the phase-shift threshold depends on the maximum values of the spatial phase-shift distribution $\varphi(x,y)$, and preferably on the maximum value taken by the spatial phase-shift distribution $\varphi(x,y)$. In particular, the value of the absorption threshold may correspond to a proportion of the maximum value taken by the spatial absorption distribution $a(x,y)$, this proportion decreasing with each iteration. Similarly, the value of the phase-shift threshold may correspond to a proportion of the maximum value taken by the spatial phase-shift distribution $\varphi(x,y)$, this proportion decreasing with each iteration. It is of course possible for the proportion to also be defined based on a number of values of the spatial distributions, it for example being a proportion of an average or other indicator.

By way of example, in the first iteration, the absorption threshold for the spatial absorption distribution $a(x,y)$ and/or the phase-shift threshold for the spatial phase-shift distribution $\varphi(x,y)$ of the imaged object corresponds to between 40% and 15% of the maximum value of the spatial absorption distribution $a(x,y)$ or of the spatial phase-shift distribution $\varphi(x,y)$, respectively, and preferably corresponds to between 30% and 20% of the maximum value of the spatial absorption distribution $a(x,y)$ or of the spatial phase-shift distribution $\varphi(x,y)$, respectively. Then, in each iteration, the threshold is decreased by 2% to 6% of the maximum value of the spatial absorption distribution $a(x,y)$ or of the spatial phase-shift distribution $\varphi(x,y)$. In the last iteration, the threshold for the spatial absorption distribution $a(x,y)$ is set to zero and the threshold for the spatial phase-shift distribution $\varphi(x,y)$ of the imaged object is set to zero. The initial values of the thresholds, and their decrease with each iteration, in particular depend on the nature of the imaged object 1, and may therefore be adapted thereto. As indicated above, the number of iterations essentially depends on the initial values of the thresholds, and on their decrease with each iteration. The decrease in the thresholds may be regular or irregular.

Insofar as the noise caused by the twin image is always lower in amplitude than the representation of the imaged object in the hologram, the thresholding removes the contribution of the twin image more than the representation of the imaged object. Specifically, by definition, the imaged object is at the focus in the object field, whereas the twin image is out of focus.

After applying thresholding, a modified spatial absorption distribution $a'(x,y)$ and a modified spatial phase-shift distribution $\varphi'(x,y)$ are obtained, these defining a modified complex object field $U'(x,y,z_o)$:

$$U(x,y,z_o)=\exp(j\Omega(z_o))(1-a'(x,y)\exp(-j\varphi'(x,y)))$$

Preferably, the second iterative step comprises smoothing the modified spatial absorption distribution and the modified spatial phase-shift distribution, typically by applying low-pass filtering, for example Gaussian filtering or the like. The smoothing makes it possible to avoid the generation of high-frequency components at the edges caused by thresholding. Preferably, the size of the smoothing filter (i.e. the number of adjacent pixels taken into account simultaneously during the filtering) is decreased as the iterations progress, for example at the same time as the thresholds are decreased. This makes it possible to locate, at the end of the iterations, significant contrasts in the imaged object.

In a third iterative step (step S03c), a modified hologram field $U'(x,y,z_h)$ is determined by re-propagation of the modified object field $U'(x,y,z_o)$ to the hologram coordinate $z_h$. The re-propagation employs the same modalities as the back-propagation mentioned above, and may thus make use of a light diffraction model, such as for example the Rayleigh-Sommerfeld model or the Kirchhoff diffraction model. The resulting modified hologram field $U'(x,y,z_h)$ comprises a modified amplitude and a modified phase $\Omega'(x,y,z_h)$, which reflect the modifications made to the absorption and phase shift of the imaged object 1 in the preceding thresholding step. Only the modified phase is exploited in the following step.

In a fourth iterative step (step S03d), the phase of the hologram field $\Omega(x,y,z_h)$ is replaced by the modified phase $\Omega'(x,y,z_h)$, whereas the amplitude of the hologram field is retained. In other words, the modified hologram field $U'(x,y,z_h)$ becomes the hologram field, the modified spatial amplitude distribution being replaced by the initial spatial amplitude distribution. Specifically, it will be recalled that the hologram is representative of a spatial intensity distribution $H(x,y)$ corresponding to the spatial amplitude distribution of the hologram field $U(x,y,z_h)$. It follows that the spatial amplitude distribution of the hologram field $U(x,y,z_h)$ is determined by the hologram, and does not need to be modified. In contrast, the phase of the hologram field $\Omega(x,y,z_h)$ is not set, and is updated in each iteration.

Following this fourth iterative step (step S03d), the hologram field will therefore have had its spatial phase distribution $\Omega(x,y,z_h)$ updated, and a new iteration may begin with the first iterative step (step S03a), with however an absorption threshold and a shift threshold decreased with respect to the previous iteration. The cycles of iterations end when a criterion is met, such as for example the criterion that the absorption threshold and/or the shift threshold be zero, or at least below a threshold value. It is also possible to set a number of iterations, the criterion then being that the set number of iterations has been reached.

Following the iterations, the values of the spatial phase-shift and absorption distribution of the imaged object are determined (step S04) to be those resulting from a last iteration. More precisely, the values of the spatial phase-shift and absorption distribution of the imaged object are those corresponding to the last object field obtained by back-propagation to the object coordinate of the last hologram field.

In each iteration, absorption and phase-shift values are obtained. These values are, however, tainted with noise, essentially due to the twin image. The thresholding allows the most important contributions to be retained, while less significant contributions, tainted by noise, are gradually eliminated. Noise is therefore reduced with each iteration. Compared to existing methods, the method according to the invention has the advantage of converging rapidly, and of completely eliminating noise due to the twin image.

The method, as a result of the gradual decrease in thresholds, may be interpreted as first removing noise caused by the twin image in most scattering regions, ignoring all the details. Then, as the thresholds decrease, information is then recovered from less scattering elements. It is therefore possible to take advantage of this gradual recovery of details to accelerate the speed of the method, by first working with a low-resolution hologram field and/or object field, then by increasing this resolution as the iterations progress, for example at the same time as the thresholds are decreased. Specifically, at the beginning of the iterations, the image is approximated by the most scattering regions alone, while, with the gradual lowering of the thresholds, finer and finer details are recovered, justifying the increase in resolution. At the end of the iterations, the fields may regain the same resolution as the initial hologram. Applying the iterations to fields of lower resolution makes it possible to greatly accelerate the speed of the method.

The method is particularly suitable for biological imaging, in which the imaged object is a biological sample acquired by holographic microscopy. Specifically, objects of biological origin generally have a positive absorption and phase shifts with well-defined outlines. Biological imaging is therefore the preferred application of the method. The method may however be used on types of objects other than biological objects.

In order to illustrate the effects of the iterations, FIGS. 2 to 5d show a first example of implementation of these iterations on a computer-generated hologram of a group of objects representing a micro-colony of rod bacteria. FIG. 3 shows the original computer-generated hologram, i.e. the hologram generated from the spatial intensity distribution $H(x,y)$ recorded by image sensor 2. As may be seen, the twin image induced by the group strongly distorts the shapes of the individual bacteria composing it. These rod bacteria contain an alignment of four internal scattering structures. The bacteria have an absorption of 0.02, and a $\varphi$ phase shift of 0.08, with the internal scattering structures having a maximum absorption of 0.05 and a maximum phase shift of 0.1.

FIG. 4a shows the spatial phase-shift distribution corresponding to the initial object field of FIG. 3, after back-propagation of the hologram field to the object coordinate, while FIG. 4b shows the spatial absorption distribution corresponding to the initial object field of FIG. 3, after back-propagation of the hologram field to the object coordinate. FIG. 4c shows the profile of the distribution of phase-shift values along the longitudinal axis of a rod bacterium, between the two arrows. It may be seen that, as a result of the significant amount of noise generated by the twin image, the phase-shift profile is quite flat and peaks at about 0.05, or half the maximum phase shift. The noise therefore prevents the four internal scattering structures in the bacterium from being discerned and characterized. FIG. 4d shows the profile of the distribution of absorption values along the longitudinal axis of a rod bacterium, between the two arrows. It may be seen that, as a result of the significant amount of noise generated by the twin image, the absorption profile peaks at about 0.04, or half the maximum absorption. The noise therefore prevents the four internal scattering structures in the bacterium from being characterized.

FIG. 5a shows the spatial phase-shift distribution and FIG. 5b shows the spatial absorption distribution, after the first iteration. In this example, the initial thresholds were set to 25% of the maximum values. FIG. 5c shows the profile of the distribution of phase-shift values along the longitudinal axis of a rod bacterium, between the two arrows. Compared to the previous profile of FIG. 4c, the maximum values of the phase-shift profile have clearly increased, now standing at about 0.07. FIG. 5d shows the profile of the distribution of absorption values along the longitudinal axis of a rod bacterium, between the two arrows. Compared to the previous profile of FIG. 4d, the maximum values of the absorption profile have increased to about 0.05.

FIG. 6a shows the spatial phase-shift distribution and FIG. 6b shows the spatial absorption distribution, after the fifth iteration. The absorption and phase-shift thresholds were gradually reduced with each iteration. FIG. 6c shows the profile of the distribution of phase-shift values along the longitudinal axis of a rod bacterium, between the two arrows. Compared to the previous profile of FIG. 5c, the maximum values of the phase-shift profile have clearly further increased, now standing at about 0.09. However, the differences in values between the internal scattering structures and the bacterium are still small. FIG. 6d shows the profile of the distribution of absorption values along the longitudinal axis of a rod bacterium, between the two arrows. Compared to the previous profile of FIG. 5d, the differences in values between the internal scattering structures and the bacterium have been accentuated.

Figures 7A, 7B, 7C, 7D, 8A, 8B:
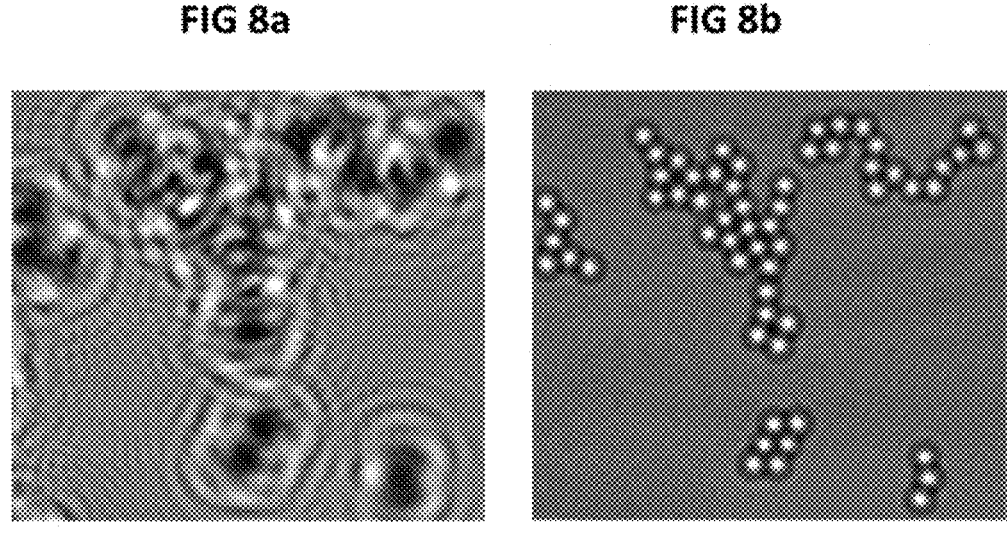
FIG. 7a shows a spatial phase-shift distribution after the twentieth iteration, in the first example of implementation of the method according to one possible embodiment of the invention.
FIG. 7b shows a spatial absorption distribution after the twentieth iteration, in the first example of implementation of the method according to one possible embodiment of the invention.
FIG. 7c shows a profile of phase-shift values of a bacterium in FIG. 7a, FIG. 7d shows a profile of absorption values of a bacterium in FIG. 7b.
FIG. 8a shows a hologram of polystyrene beads acquired by an imaging system in a second example of implementation of the method according to one possible embodiment of the invention.
FIG. 8b shows a photograph of the polystyrene beads of the second example of implementation of the method.

FIG. 7a shows the spatial phase-shift distribution and FIG. 7b shows the spatial absorption distribution, after the twentieth and last iteration. The absorption and phase-shift thresholds were gradually reduced in each iteration to zero in this last iteration. FIG. 7c shows the profile of the distribution of phase-shift values along the longitudinal axis of a rod bacterium, between the two arrows. Compared to the previous profile of FIG. 6c, the maximum values of the phase-shift profile have increased, now standing at about 0.10. In addition, the differences in values between the internal scattering structures and the bacterium have been accentuated, the absorption values of the bacterium now approaching 0.08. The real values of spatial absorption distribution of the imaged object are therefore indeed found. FIG. 7d shows the profile of the distribution of absorption values along the longitudinal axis of a rod bacterium, between the two arrows. Compared to the previous profile of FIG. 6d, the differences in values between the internal scattering structures and the bacterium have been further accentuated. Now, the maximum values corresponding to the internal scattering structures reach 0.05, while the minimum values corresponding to the bacterium reach 0.02. The real values of spatial absorption distribution of the imaged object are therefore indeed found.

The method therefore makes it possible, with only 20 iterations in this example, to completely eliminate noise and to find the exact values of the phase shift and absorption of the bacteria, including their internal scattering structures. Insofar as the thresholding eliminates the contributions of the twin image more than the contributions of the imaged object, the rapidness of convergence will increase as the size of spatial region set to zero at the end of the iterations increases. Convergence is therefore more rapid when the region of interest in the image is small. If the cluster in FIG. 3 had contained more bacteria, i.e. if there were more objects of interest to be imaged, the number of iterations would have had to have been made higher to find the exact phase-shift and absorption values, for example by decreasing the thresholds more slowly.

FIGS. 8a to 10b show one example of implementation of the method on experimental data. Polystyrene beads 1.1 μm in diameter were randomly placed on a slide by drying a colloidal suspension, then by immersing them in oil, and the hologram of the FIG. 8a was acquired. The polystyrene beads generated a large phase shift, but had a very low absorption. By way of non-limiting example, the holographic imaging system used to acquire the hologram of this example was an in-line holographic microscopy system, which employed, as light source 4, a monochromatic LED that emitted at 405 nm with a full width at half maximum of 12 nm. The light source 4 was placed 100 nm from the slide. The holographic imaging system comprised a microscope objective 8, with a numerical aperture of 100×1.3 for a magnification of 80. A CMOS sensor was used as image sensor 2. The beads had a refractive index of about 1.63, and the immersion oil had a refractive index of about 1.53. FIG. 8a shows the hologram after normalization with the background image. By way of comparison, FIG. 8b shows a non-holographic image of the beads in the same configuration.

Similarly to FIGS. 2a and 2b, FIG. 9a shows the spatial phase-shift distribution corresponding to the initial hologram of FIG. 8a, after back-propagation of the hologram field to the object coordinate, while FIG. 9b shows the spatial absorption distribution corresponding to the original image of FIG. 8a, after back-propagation of the hologram field to the object coordinate. It may be seen here that the spatial phase-shift and absorption distributions are again very much affected by noise generated by the twin image. In particular, the spatial absorption distribution contains large fluctuations, even though the beads are supposed to have a low absorption.

As explained above, a plurality of cycles of iterations are implemented. FIG. 10a shows the spatial phase-shift distribution and FIG. 10b shows the spatial absorption distribution, after the fiftieth and last iteration. The absorption and phase-shift thresholds were gradually reduced in each iteration to zero in this last iteration. It may be seen that, on the one hand, the spatial phase-shift distribution now clearly corresponds to the distribution of the beads such as illustrated in FIG. 8b. On the other hand, the low values of the spatial absorption distribution correctly reflect the low absorbency of the polystyrene beads. The noise caused by the twin image has therefore been effectively eliminated, and the values of the spatial phase-shift and absorption distributions have been correctly determined.

The invention is not limited to the embodiment described and shown in the appended figures. Modifications remain possible, in particular from the point of view of the nature of the various technical features or of substitution of technical equivalents, without however departing from the scope of protection of the invention.

The invention claimed is:

1. A digital holographic imaging method, comprising the following steps:
   (a) obtaining a single hologram by holography, said hologram being representative of a spatial intensity distribution, in a hologram plane at a hologram coordinate of an imaged object, of interference caused by interactions between an illumination beam and the imaged object placed at an object coordinate on an imaging axis,
   (b) implementing a plurality of iterations, each comprising the following steps:
      (i) by back-propagation to the object coordinate of a hologram field comprising a spatial amplitude distribution corresponding to the spatial intensity distribution of the hologram and a spatial phase distribution, determining an object field containing a spatial absorption distribution and a spatial phase-shift distribution of the imaged object,
      (ii) thresholding values of the spatial absorption distribution and of the spatial phase-shift distribution of the imaged object by decreasing the values of the spatial absorption distribution below an absorption threshold and by decreasing the values of the spatial phase-shift distribution below a phase-shift threshold, the absorption threshold and the phase-shift threshold decreasing with each iteration,
      (iii) by re-propagation of the object field to the hologram coordinate, determining a modified hologram field comprising a modified spatial amplitude distribution and a modified spatial phase distribution,
      (iv) replacing the spatial phase distribution of the hologram field with the modified spatial phase distribution, the spatial amplitude distribution of the hologram field being retained,
   (c) determining the spatial phase-shift distribution and the spatial absorption distribution of the imaged object as being those of the object field of a last iteration.

2. The method as claimed in claim 1, wherein, during thresholding, the values of the spatial absorption distribution below the absorption threshold and the values of the spatial phase-shift distribution below the phase-shift threshold are set to zero.

3. The method as claimed in claim 1, wherein the absorption threshold depends on maximum values of the spatial absorption distribution, and the phase-shift threshold depends on maximum values of the spatial phase-shift distribution contained in the object field.

4. The method as claimed in claim 1, wherein, in the first iteration, the absorption threshold and/or the phase-shift threshold corresponds to between 40% and 15% of a maximum value of the spatial absorption distribution or spatial phase-shift distribution, respectively.

5. The method as claimed in claim 1, wherein, in each iteration, the absorption threshold and/or the phase-shift threshold is decreased by 1% to 6% of a maximum value of the spatial absorption distribution or spatial phase-shift distribution.

6. The method as claimed in claim 1, wherein in the last iteration, the absorption threshold and the phase-shift threshold are set to zero.

7. The method as claimed in claim 1, wherein, during thresholding, the values of the spatial absorption and phase-shift distribution are kept positive or zero during the iterations.

8. The method as claimed in claim 1, wherein, before the iterations, the hologram field is normalized by dividing the values of the spatial intensity distribution by a background image value corresponding to an intensity of the illumination beam at the hologram coordinate.

9. The method as claimed in claim 1, wherein the thresholding comprises smoothing the modified spatial absorption distribution and the modified spatial phase-shift distribution.

10. The method as claimed in claim 1, wherein the hologram field and/or the object field have a spatial resolution that increases with the iterations.

\* \* \* \* \*